May 14, 1957 W. J. POPOWSKY 2,792,565

CONTROL APPARATUS

Filed Feb. 23, 1954

INVENTOR.
WILLIAM J. POPOWSKY.

BY Arthur H. Swanson

ATTORNEY.

United States Patent Office 2,792,565

Patented May 14, 1957

2,792,565

CONTROL APPARATUS

William J. Popowsky, Philadelphia, Pa., assignor to Minneapolis-Honeywell Regulator Company, Minneapolis, Minn., a corporation of Delaware Application February 23, 1954, Serial No. 411,884

15 Claims. (Cl. 340—187)

A general object of the present invention is to provide an improved electrical apparatus characterized by its freedom from loss effects normally inherent in such apparatus. More specifically, the present invention relates to apparatus including an electromagnetic unidirectional current amplifier employing positive feedback means to obtain maximum gain.

In the field of automatic control, it is frequently desired to produce control signals which may readily be transmitted over long distances. Unidirectional current signals have been found to be very satisfactory in distant telemetering apparatus due to such signals being subject to a minimum of line loss and due to the convenience of designing utilizing equipment which is responsive only to unidirectional signals and free from alternating current strays. As the input signals in many control problems are frequently very minute, it is essential that some effective means be provided for amplifying the signals which are used so that control functions may be accomplished directly by the output control signal. To be acceptable, such amplifying apparatus must be reliable, accurate, and be constructed of components which will insure a long service life for the apparatus.

It has been found that an electrical unidirectional current amplifier means may be formed by using an electromagnetic field for varying a resistance in a unidirectional current circuit which may form the output of the apparatus. To enhance the amplification characteristics in amplifying devices of this type and to overcome loss effects of a mechanical or electrical nature, positive feedback action from the output is produced by a further electromagnetic field which varies in accordance with the magnitude of the output.

It is accordingly a more specific object of the present invention to provide an improved electrical controller incorporating a unidirectional current amplifier of the variable resistance type having positive feedback means for increasing the amplification of the apparatus.

Another more specific object of the present invention is to provide a new and improved electrical controller having a variable unidirectional current amplifier incorporting a force detector in the form of a chamber having a liquid therein whose level is variably adjusted to vary the short circuiting effect of the liquid upon a resistance unit and using the output current of the resistance unit for creating a further force which will act as positive feedback in the apparatus to enhance the apparatus gain.

A further object of the present invention is to provide an electrical control apparatus including means for locking the control apparatus in a fixed position regardless of the position which the apparatus is in at the instant when the locking is effected.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there has been illustrated and described preferred embodiments of the invention.

Figures 1, 2, 3:
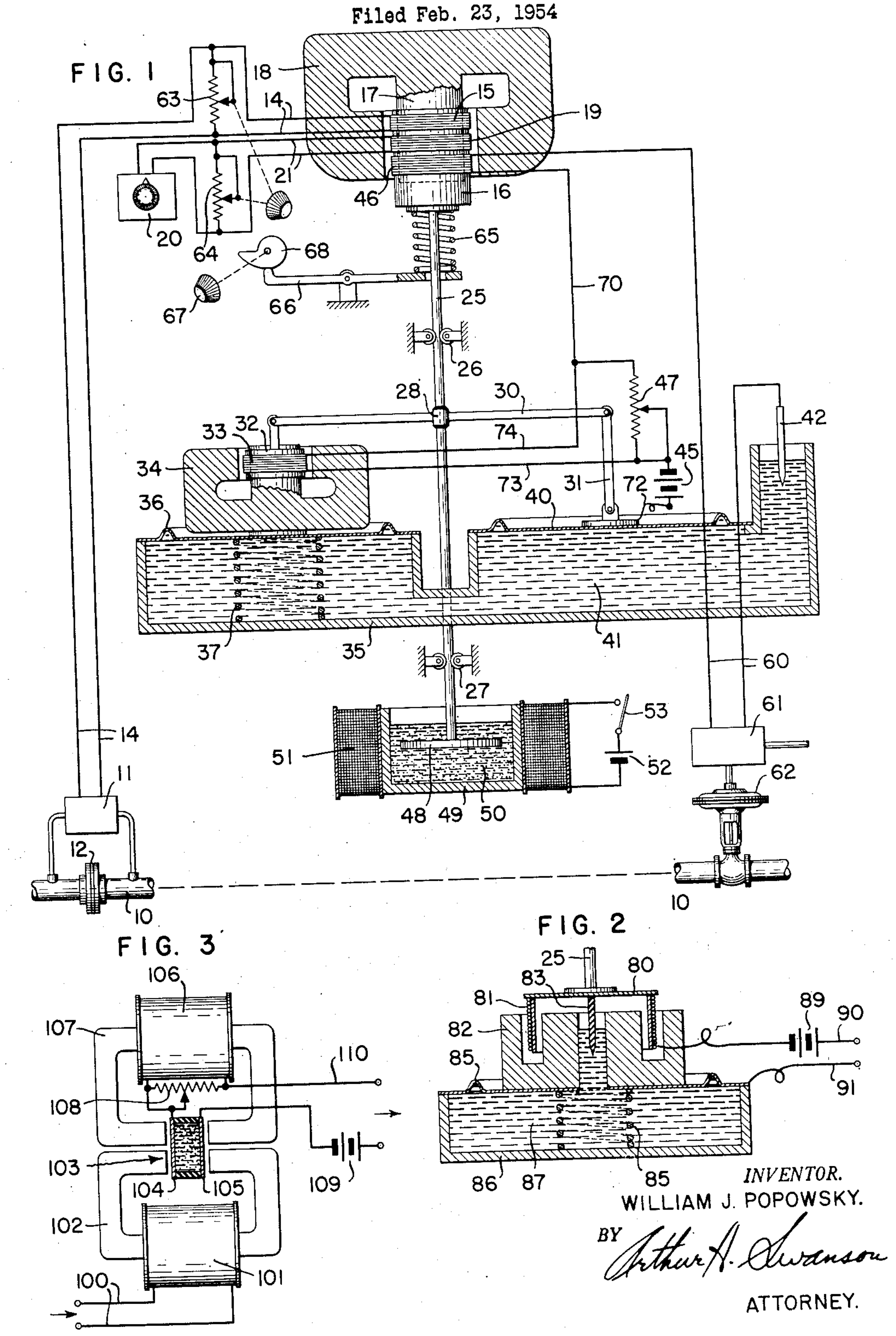
Fig. 1 is a diagrammatic showing of an electrical controller which incorporates the principal features of the present invention.
Fig. 2 is a modified form of force to current producing device.
Fig. 3 is a further modified form of amplifying apparatus incorporating the principles of the present invention.

Referring first to Fig. 1, the numeral 10 represents a conduit through which is flowing a fluid. For measuring the rate of flow of the fluid through the conduit 10, a differential pressure measuring device 11 is connected to the pipe 10 across an orifice member 12. This measuring instrument 11 may well take the form of the differential pressure transmitter shown in the copending application of William F. Newbold entitled Control Apparatus, Serial No. 391,207, filed November 10, 1953, now Patent 2,762,938, issued September 11, 1956. The output of the transmitter 11 will be on a pair of leads 14 and will be in the form of a direct current signal proportional to the rate of fluid flow through the pipe 10. The direct current signal on the leads 14 are applied to a coil 15. This coil is wound upon a suitable cylindrical coil form 16 which is adapted to move along the principal axis of a center core 17 of a permanent magnetic member 18. The magnet 18 is frequently referred to as a pot magnet and the coil 15 may be referred to as a pot coil. Also carried by the coil form 16 is a further coil 19. This coil receives its energization from a direct current source 20 which may be manually adjusted. The source 20 is connected to the coil 19 by way of the leads 21.

Firmly connected to the coil form 16 is a rod 25. The rod 25 is centered and maintained in position by a pair of suitable bearing members 26 and 27. Rigidly fastened at 28 on the beam 25 is a further beam 30, the latter having on the right end thereof a connecting link 31 and on the left end thereof a coil form 32 having a coil 33 wound thereon which is positioned within the magnetic field of a further pot magnet 34.

Positioned beneath the magnet 34 and the link 31 is a liquid filled chamber 35. A diaphragm 36 enclosing one section of the chamber 35 serves as a supporting means for the pot magnet 34. A spring member 37 is positioned directly under the magnet 34 and is effective to partially counteract the weight of the permanent magnet 34 on the diaphragm 36. On the opposite side of the chamber 35 is a further diaphragm 40 having the link 31 connected to the center thereof. The liquid 41 within the chamber completely fills the chamber and extends into an upwardly extending tube of reduced cross section into which there is projecting a resistance unit 42. The resistance unit 42 may well be formed of carbon or like resistance material. The liquid 41 within the chamber 35 may well be mercury or some other suitable liquid having a high conductivity which is effective to variably short circuit the resistance of the element 42 as the liquid rises and falls over the surface of the element.

A direct current source 45 is connected in series with the resistance unit as is the coil 33. Also connected in the resistance unit is a further coil 46 which is on the coil form 16. An adjustable shunting resistor 47 is connected across the coil 33 so as to provide means for variably adjusting the current flow through the coil 33. Positioned on the lower end of the rod 25 is a disk 48. This disk extends into a chamber 49 which is filled with a liquid 50 of the type having fine particles of magnetic material suspended therein. In order to lock the disk 48 or freeze the disk 48 in the liquid 50, so as to prevent the movement of the rod 25, an electromagnetic coil 51 is wound around the chamber 49 and is adapted when energized to effectively solidify the liquid 50. In order to energize the coil 51, a battery 52 and a switch 53 have been provided. Normally, the switch 53 will not be closed.

The output current from the apparatus flows through leads 60 to a suitable electric to pneumatic transducer 61. This apparatus may well take the form of the transducer shown in the copending application of Frederick W. Side, Serial No. 358,423, filed May 29, 1953. The output of this transducer is in the form of a pneumatic pressure which may be used to control a flow control valve 62 which is positioned in the conduit 10.

In order to manually reset the control action of the controller, there is provided a spring 65 which has a lever 66 cooperating therewith to vary the compression thereof as it acts against the end of the coil form 16. A manual knob 67 operating by way of a cam 68 is used to variably adjust the reaction force of the spring 65.

In considering the operation of the apparatus of Fig. 1, it is first assumed that there is an electrical signal originating from the flow sensing instrument 11 and the direct current signal is flowing through the leads 14 to the coil 15. It is further assumed that a further input signal is originating from the source 20 and this signal is flowing through the coil 19. The current flowing through the coil 15 will produce a force on the rod 25. It is assumed that this force due to the coil 15 having the current flow therein reacting with the flux from the permanent magnet creates a force which is downward on the rod 25. It is further assumed that the current flowing through the coil 19 reacting with the flux from the permanent magnet 18 creates a force on the rod 25 which is acting upwardly. When there is a difference between the input force from the transmitter 11 and the force from the set point source 20, there will be a resultant force upon the rod 25. Assuming that this force is in a downward direction, there will be a tendency for the rod 25 to move downwardly and in so moving, the beam 30 will be moved in a downward direction with the link 31 acting upon the diaphragm 40 to decrease the internal volume of the chamber 35.

In addition, the beam 30 tends to move the coil 32 in a downward direction and, with a fixed current flow through the coil 33 there will be a constant reaction force on the magnet 34 tending to move the magnet downwardly. The decrease in the volume of the chamber 35 caused initially by the deflection of diaphragm 40 will cause the liquid 41 to rise in the extension of the chamber wherein is located the resistance element 42. The resistance of the element 42 will then be determined by the level of the liquid thereon. This resistance determines the amount of current flowing in the output circuit which may be traced from the battery 45 through resistor 47, lead 70, coil 46, lead 60, valve positioner 61, lead 60, resistor 42, liquid 41 and lead 72 to the lower terminal of the battery 45. In addition, the output current also flows from the battery 45 through leads 73 to coil 33, lead 74, lead 70, and thence through the last traced circuit to the lower terminal of the battery 45.

The current flowing through the coil 46 will be in a direction to produce a force which will balance the input force difference from the coils 15 and 19. In other words, the force from the coil 46 will be in an upward direction to balance the predominate downward force due to the force from the coil 15 being larger than the force from coil 19. In addition, the current flow through the valve positioner will tend to cause the valve 62 to be repositioned to a value which will maintain the valve at a desired value to control the flow through the conduit 10.

As apparatus of this type has frictional losses and other electrical and mechanical losses, it is essential that maximum gain be achieved. This is achieved in the present arrangement by the positive feedback action produced by the current flowing through the coil 33 in the circuit which was traced above. This positive feedback will have the effect of creating a further force in a downward direction on the diaphragm 36 which will tend to move the level of the liquid 41 to a higher level on the resistance 42. The level of this current in this positive feedback circuit must be maintained below the level which would initiate instability in the controller and this level may be adjusted by the shunting rheostat 47 which is connected across the coil 33. The output current flow will then be, with this positive feedback force acting in the apparatus, of a maximum value.

If the flow conditions in the conduit 10 should change so that there is an increase in the current flow through the leads 14, the increased current flow will pass through the coil 15 and apply an increased downward force on the rod 25. The increased force will cause the link 31 to decrease the volume of the chamber 35 and cause the liquid 41 to rise further over the resistance unit 42. This change in the resistance unit resistance will cause an increase in the current flow through the output circuit including the leads 60 and in addition will create a further force balancing force by reason of the current flow through the coil 46. As before, the change in output current will also change the positive feedback action of the coil 33 and a further force will act upon the diaphragm 36 by way of the magnet 34 and also upon the diaphragm 40 by way of the beam 30 and link 31. This will cause the liquid 41 to rise even further in the extension of the chamber 35 over the resistance 42 and it will cause the output current to increase even further.

In the event that the change in the conditions in the pipe 10 should be in the opposite direction, the operation of the apparatus will be the reverse of the above assumed conditions. The net result in a change in either direction of the input signal is to give maximum change in the output direct current of the apparatus.

Inasmuch as controllers of the present type may require servicing, or other components of the apparatus may require attention, even while it is desired that flow continue to pass through the conduit 10, it is essential that the output conditions of the controller may be locked or frozen at a particular control value. To achieve this in the present apparatus, the disk 48 may be frozen in the liquid 50 by energizing the coil 51. The energization of the coil 51 is accomplished by closing the switch 53 which is in series with the battery 52. The magnetic particles within the liquid 50 will effectively lock or freeze the liquid and prevent any movement of the disk 48 so that the level of the liquid 41 within the chamber 45 will remain stationary upon the resistor 42. When the coil 51 is not energized, the disk 48 and liquid 50 act to damp out any sudden movements of rod 25. The gain of the apparatus may be controlled by a pair of gauged shunting rheostats 63 and 64 which may be used to vary the current flowing in the coils 15 and 19. If the coils 15 and 19 are combined as a single coil, then a single gain control rheostat may be used to shunt the coil.

In order to reset the output control current magnitude with a particular input signal, it is necessary to vary the force of the spring 65 by adjusting the knob 67 and cam 68 to variably move the lever 66 against the spring 65. In this manner, the forces acting upon the rod 25 may be varied so as to effect a desired variation in the output current from the apparatus.

Referring now to Fig. 2, there is shown here a modified form of the apparatus for producing an amplified direct current signal. Here, the input rod 25 is connected to a coil supporting member 80 which has a pot coil 81 supported at the outer ends thereof. This coil 81 is adapted to be positioned within the magnetic field of a permanent magnet 82. Also connected to the rod 25 is a resistance unit 83.

The permanent magnet 82 rests upon a diaphargm 85 which forms the top enclosure of a chamber 86. This chamber is filled with a suitable liquid 87, such as the liquid used in Fig. 1. The center portion of the permanent magnet 82 is open and the resistance unit 83 projects therein so that the liquid within the chamber 87 may flow into the opening and contact the resistance unit 83. A spring 88 is positioned within the chamber 86 and beneath the magnetic member 82 to partially support the same. A battery 89 is shown connected in series with output leads 90 and 91.

In considering the operation of Fig. 2, it may be assumed that the force acting upon the input rod 25 is a downward force so that the rod 25 will tend to push the coil 81 further into the field of the magnetic member 82 and at the same time move the resistance unit 83 into the upwardly extending column of the liquid 87. The movement of the coil 81 into the magnetic field 82 will tend to cause the magnet to be deflected downwardly against the force of the spring 88 and there will be a rise of the liquid 87 into the hollow center portion of the magnetic member 82 to further cover the resistance unit 83. The change in the resistance will cause a change in the current flow through the coil 81. The current flow circuit for the coil 81 may be traced from the left end terminal of the battery 89 through coil 81, frame member 80, resistor unit 83, liquid 87, lead 91, to a suitable utilization device and then by way of lead 90 back to the other terminal of the battery 89. This current flow will create a further force tending to move the magnetic member 82 downwardly to cause the liquid 87 to rise even higher over the resistance unit 83. This positive feedback action of the coil 81 tends to enhance the amplifying characteristics of the device in a manner corresponding to the similar portion of the apparatus of Fig. 1.

The apparatus as shown in Fig. 3 is a further modification of an electromagnetic direct current type of amplifier employing positive feedback. This unit may be used in any desired manner in cooperation with the apparatus of Fig. 1 wherein it is desired to further amplify the direct current signals of the apparatus. Here, a pair of input leads 100 connect to a coil 101 wound upon a suitable iron core 102. This iron core is opened at the end opposite coil 101 and positioned therein is a variable resistance unit 103, said unit being filled with oil having carbonyl iron suspended therein. This unit comprises a pair of electrodes 104 and 105 on either side of the unit, said electrodes forming terminals for the resistance unit.

Connected in series with the output terminals 104 and 105 is an output coil 106 which is wound upon a further core member 107. This core member is opened at the side opposite the coil 106 and provides a magnetic field for the variable resistance unit 103. A resistance shunt 108 is connected across the input leads to the coil 106 for variably adjusting the current flow through said coil. A suitable battery 109 may be used to supply the direct current signal for use in the output circuit of the apparatus.

Considering the operation of the apparatus of Fig. 3, it is first assumed that there is a predetermined input current flowing through the input leads 100 and through the input coil 101. This coil will act to produce in the core 102 a magnetic flux which will pass through the variable resistance unit 103. The iron particles or magnetic particles within the liquid in the unit will decrease their resistance in accordance with the magnitude of the flux applied thereto by the core 102. This will decrease the resistance between the terminals 104 and 105 and there will be an increased current flow in the output circuit which may be traced from the left end of the battery 109, the terminal 105, through the resistance unit, the terminal 104, coil 106, and lead 110 to a utilization circuit back to the other end terminal of the battery 109. In addition, some current will be flowing through the shunting resistor 108 and will serve to limit the amount of current flowing through the coil 106. The current flowing through the coil 106 will create in the core 107 a magnetic flux which will pass through the resistance unit 103 and this will in turn decrease the resistance of the unit even further. This resistance decrease will cause a larger current to flow in the output and it is thus possible to achieve a very high gain in the apparatus. The gain of the apparatus may be varied by varying the shunting effect of the resistor 108 connected in parallel with the coil 106.

It will thus be readily apparent from the foregoing description that there has been provided a new and improved form of amplifying apparatus for producing an amplified direct or unidirectional current signal which may be utilized in any desired manner in an electrical controller or other suitable electrical apparatus. While this has been shown and described in connection with a direct current device, the principles are equally applicable to an alternating current amplifying device.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

What I claim as new and desire to secure by Letters Patent is:

1. Electro-mechanical apparatus for use in a controller comprising, signal conversion means for producing an output electrical current proportional to a variable, and circuit means including an electromagnetic feedback coil having said current flowing therein for acting regeneratively upon said conversion means to produce an additional current change in the same direction as produced by the signal conversion means to increase the gain thereof.

2. Apparatus for producing an output electrical current signal proportional to the magnitude of an input variable, comprising, an input coil, a variable resistance unit adapted to have its resistance magnitude varied in accordance with the energization of said input coil, an output circuit including said resistance unit, and a positive feedback coil connected in said output circuit, said feedback coil producing on said resistance unit an effect to cause a change in the magnitude thereof in the same direction as any change caused by said input coil.

3. Apparatus for producing an output electrical current signal proportional to the magnitude of an input comprising, an input force producing means, a variable resistance element operatively connected to said force producing means and adapted to be varied in accordance with the magnitude of the input force, an output electrical current circuit including said variable resistance element, said output circuit having an electromagnetic coil therein, and means including said coil for creating a second regenerative force which acts in the same direction as said input force upon said variable resistance element.

4. Apparatus for producing a unidirectional current signal proportional to the magnitude of an input variable comprising, a first coil adapted to be positioned in a magnetic field and having a unidirectional current input thereto which varies in accordance with the magnitude of a variable, said first coil reacting with said magnetic field to create a force proportional to the magnitude of the input variable, a resistance unit connected to said coil adapted to be variably adjusted in accordance with the force created by said first coil, an output unidirectional current circuit including a second coil and said resistance unit, said second coil reacting with said magnetic field to create an opposing force to the force created by said first coil, a third coil cooperating with a magnetic field connected to said resistance unit, said third coil being connected in said output circuit and creating a force on said resistance unit in a direction to cause the magnitude of the resistance thereof to be varied in the direction caused by the force created by said first coil.

5. Apparatus as defined in claim 4 wherein a fourth coil cooperates with said first magnetic field and has applied thereto a manually adjustable unidirectional current signal source.

6. Apparatus as defined in claim 4 wherein said apparatus includes a resilient means connected to create a force on said resistance unit so as to reset the output current controlled by said resistance unit to a predetermined value.

7. Apparatus as defined in claim 4 including means for freezing said resistance unit in a fixed position, said means comprising an electromagnetic field operating upon a solution containing magnetic particles.

8. An electrical direct current control member comprising, a chamber filled with a liquid, said chamber having a flexible wall therein, a resistance unit projecting into said chamber and contacting said liquid, said resistance being varied by the movement of said liquid, input means acting upon said flexible member to effect the movement of said liquid in accordance with the magnitude of the input force, and means including a coil in series with said resistance unit for creating a further force on said liquid to effect the movement of said liquid in the same manner as effected by said input force.

9. A variable current producing device comprising, an input member adapted to have applied thereto a force which varies in accordance with the magnitude of a variable, a liquid filled chamber having a pair of flexible diaphragms therein and an opening into which is projected a resistance unit, said resistance unit having its resistance varied in accordance with the extent to which the liquid covers said resistance unit, means including said input member acting on one of said diaphragms to flex that diaphragm and vary the level of the liquid on said resistance unit, and an electromagnetic force producing member connected in series with said resistance unit adapted to act on the other of said diaphragms to create a force which will vary the level of said liquid in a direction to correspond to the level change created by said input member.

10. Apparatus for producing a variable unidirectional output signal comprising, an input coil for creating a magnetic field proportional to the magnitude of an input current, a chamber having a pair of electrodes on either side thereof filled with a liquid having magnetic particles suspended therein with the resistance of said liquid between said electrodes being variable in accordance with the magnitude of the input direct current signal, and an output circuit including a second electromagnetic coil adapted to produce a further magnetic field on said liquid so as to cause said liquid to vary in resistance in the same manner as caused by said input current.

11. An electrical controller for producing a unidirectional output signal proportional to the magnitude of the input variable comprising, a variable current producing member including a member movable in accordance with the magnitude of an input variable, an electromagnetic means for locking said member in a fixed position to maintain the output of said controller at a magnitude corresponding to the magnitude at the instant at which the electromagnetic means is rendered effective.

12. Apparatus as defined in claim 11 wherein said electromagnetic means includes a member positioned in a chamber having a liquid with suspended magnetic particles therein with means for applying a magnetic field to said member.

13. Apparatus for producing an electrical signal proportional to the magnitude of an input variable comprising, an input force producing coil, a resistance unit connected to said coil to have the resistance thereof varied in accordance with the force created by said coil, an output circuit including said resistance unit, and a positive feedback coil included in said output circuit and connected to vary the force acting on said resistance unit in the same direction as said first named coil.

14. Apparatus for producing an electrical signal proportional to the magnitude of an input variable comprising, an input force producing coil, a resistance unit connected to said coil to have the resistance thereof varied in accordance with the force created by said coil, an output circuit including said resistance unit, a positive feedback coil included in said output circuit and connected to vary the force acting on said resistance unit in the same direction as said first named coil, and an adjustable resilient force producing member acting on said resistance unit to vary the net force on said resistance unit.

15. Apparatus for producing an electrical signal proportional to the magnitude of an input variable comprising, an input force producing coil, a gain control rheostat connected to variably shunt said coil, a resistance unit connected to said coil to have the resistance thereof varied in accordance with the force created by said coil, an output circuit including said resistance unit, and a positive feedback coil included in said output circuit and connected to vary the force acting on said resistance unit in the same direction as said first named coil.

References Cited in the file of this patent

UNITED STATES PATENTS

| | | |
|---|---|---|
| 2,319,363 | Wunsch et al. | May 18, 1943 |
| 2,667,237 | Rabinow | Jan. 26, 1954 |